United States Patent [19]

Brandt et al.

[11] Patent Number: 4,722,737
[45] Date of Patent: Feb. 2, 1988

[54] STABLE GAMMA-MODIFICATION OF A BENZISOTHIAZOLE AZO DYESTUFF

[75] Inventors: Horst Brandt, Odenthal; Klaus Leverenz, Leverkusen, both of Fed. Rep. of Germany

[73] Assignee: Bayer Aktiengesellschaft, Leverkusen, Fed. Rep. of Germany

[21] Appl. No.: 12,987

[22] Filed: Feb. 10, 1987

[30] Foreign Application Priority Data

Feb. 27, 1986 [DE] Fed. Rep. of Germany ....... 3606379

[51] Int. Cl.⁴ .................. C09B 67/48; D06P 3/54; D06P 1/04
[52] U.S. Cl. ........................... 8/526; 8/662; 8/690; 8/691; 8/922; 534/575; 534/753
[58] Field of Search ................. 8/526, 691; 534/575

[56] References Cited

U.S. PATENT DOCUMENTS

| | | | |
|---|---|---|---|
| 2,007,382 | 7/1935 | Ockman et al. | 8/526 |
| 3,956,270 | 5/1976 | von Rambach et al. | 534/575 |
| 4,031,073 | 6/1977 | Mory et al. | 534/753 |
| 4,319,880 | 3/1982 | Opitz et al. | 8/526 |
| 4,327,999 | 5/1982 | Koller et al. | 8/526 |
| 4,329,144 | 5/1982 | Eugster et al. | 8/526 |
| 4,332,588 | 6/1982 | Eugfster et al. | 8/526 |
| 4,374,640 | 2/1983 | Tappe et al. | 8/526 |
| 4,453,944 | 6/1984 | Liechtl et al. | 8/526 |
| 4,460,375 | 7/1984 | Sommer et al. | 8/526 |
| 4,465,628 | 8/1984 | Grund et al. | 534/788 |

FOREIGN PATENT DOCUMENTS 167913 1/1986 European Pat. Off. .

*Primary Examiner*—A. Lionel Clingman
*Attorney, Agent, or Firm*—Sprung Horn Kramer & Woods

[57] ABSTRACT

The azo dyestuff of the formula

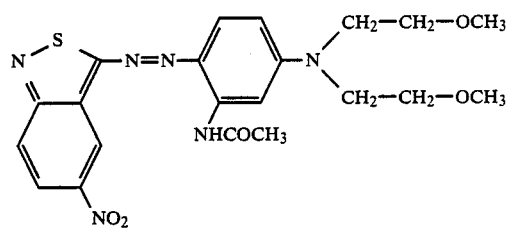

having the interplanar spacings D/Å 3.13, 3.36, 4.85, 9.26 and 13.94 for the five strongest lines having the relative intensity use 98, 89, 82, 100 and 87 is distinguished, compared to known modifications by an increased dye bath stability.

2 Claims, 3 Drawing Figures

STABLE GAMMA-MODIFICATION OF A BENZISOTHIAZOLE AZO DYESTUFF

The invention relates to the dye bath-stable γ-modification of the azo dyestuff of the formula

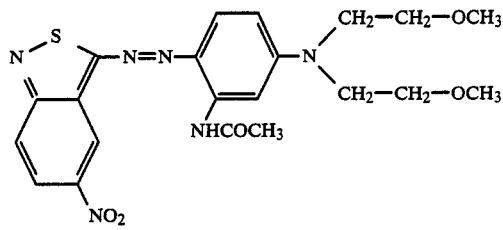

having the interplaner separations D/Å 3.13, 3.36, 4.85, 9.26 and 13.94 for the five strongest lines having the relative intensities 98, 89, 82, 100 and 87.

Figure 1:
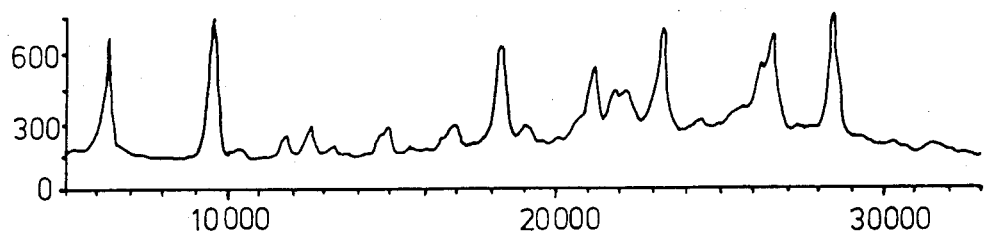

The intensities specified are taken, recorded at a wavelength λ=1.54060 Å, representatively from the diffractometer diagram shown in FIG. 1.

Figure 2:
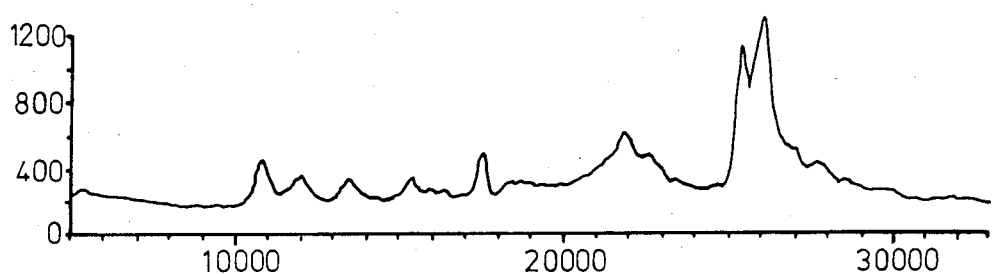

The dyestuff of the formula specified—as such—is known (cf. EP-A No. 0,167,913). In the synthesis according to Example 1 of this patent publication, the isolated acidic dyestuff press cake is resuspended in water, adjusted to a pH of 7.5 to 6 using sodium hydroxide solution, heated to 60° C. by direct introduction of steam, and tempered at 60° to 70° C. for 4 hours. The dyestuff is subsequently isolated from the dispersion, cooled to 50° C. The dried dyestuff powder then exists in the α-modification having the interplaner separations d/Å 3.41, 3.86, 3.93 and 4.04 and the relative intensities 100, 75, 47 and 45 (FIG. 2).

Figure 3:
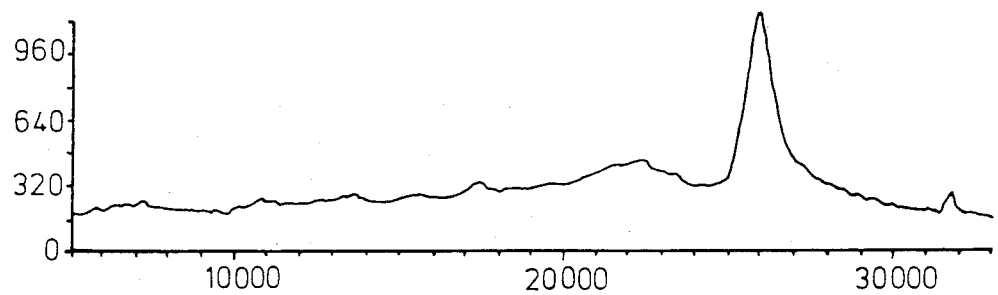

If the coupling is carried out in the presence of a non-ionogenic surfactant and the reaction liquor, after the reaction is complete, is adjusted to pH =2 to 2.2 using sodium hydroxide solution, maintained for one hour at 60° C. and subsequently isolated whilst hot, the β-modification is produced having the interplaner separations of the five strongest lines d/Å 3.43, 3.80, 3.96, 5.09 and 6.48 with the relative intensities 100, 30, 38, 29 and 31 (FIG. 3).

In contrast, the γ-modification according to the invention (melting point 160° C.; λ$_{max}$ 622.5 nm in DMF) is attained, for example, by tempering an aqueous slurry of the α-modification in the presence of an anionic dispersing agent and a non-ionic emulsifier.

The claimed γ-modification can be prepared, for example, by thermal treatment of the α-modification at 130° to 150° C. for 5 to 10 hours. The conversion is preferably carried out during finishing in the presence of, for example, ligninsulphonic acids and abietic acid/ethylene oxide reaction products at a kettle temperature of 80°–85° C. in 2 to 4 hours or, preferably, during several passages in the ball mill at processing times of 40 to 60 minutes.

The advantage of this γ-modification is the increased stability towards agglomeration and recrystallization in the case of HT dyes, but particularly, in the case of carrier dyeing, of polyester fibres. The β-modification is likewise converted into the γ-modification on tempering.

The tempering can alternatively be carried out using combinations of synthetic dispersing agents, such as reaction products from naphthalene, sulphuric acid and formaldehyde or tolyl ether, formaldehyde and sodium hydrogen sulphite and non-ionogenic surfactants, and also mixtures thereof with lignin sulphonates.

EXAMPLE 900 g of a 35% press cake, prepared by diazotization, coupling and tempering according to EP-A No. 0,167,913, Example 1, are beaten, with 470 g of a lignin-sulphonate, to a ground dough, to which 2%, relative to the crude dyestuff proportion, of an abietic acid/ethylene oxide adduct and 100 g of water are added. This suspension is first ground in a 1 liter ball mill, once at room temperature and then twice at 80° to 85° C. ground material temperature, with glass balls of size 3 1/8 and an average residence time of 30 minutes per passage. The suspension is then ground to a fineness of 1 to 2 μm during 3 passages at room temperature. The ground dough is treated with a further 120 g of dispersing agent and a dedusting agent, and spray-dried. The resultant dyestuff preparation, having a dyestuff proportion of 31%, can be introduced directly, in a conventional fashion, into a dye bath for dyeing polyester fibres.

We claim:

1. Modification, stable to dyeing, of the azo dyestuff of the formula

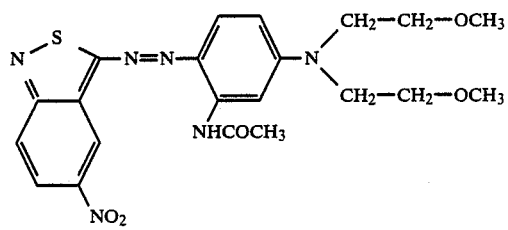

characterized by its interplanar separations D/Å 3.13, 3.36, 4.85, 9.26 and 13.94 of the five strongest lines having the relative intensities 98, 89, 82, 100 and 87.

2. Process for the preparation of the dyestuff modification according to claim 1, characterized in that the α-modification of this dyestuff, having interplanar separations d/Å 3.41, 3.49, 3.93 and 4.06 and relative intensities 100, 90, 41 and 48, or the β-modification, having the interplanar separations d/Å 3.43, 3.80, 3.96, 5.09 and 6.48 with the relative intensities 100, 30, 38, 29 and 31, is tempered in the presence of an anionic dispersing agent and a non-ionic emulsifier.

* * * * *